(12) United States Patent
Wiacker

(10) Patent No.: US 11,269,347 B2
(45) Date of Patent: Mar. 8, 2022

(54) METHOD FOR OPERATING A PARTIALLY AUTONOMOUS OR AUTONOMOUS MOTOR VEHICLE, AND MOTOR VEHICLE

(71) Applicant: Audi AG, Ingolstadt (DE)

(72) Inventor: Thomas Wiacker, Kösching (DE)

(73) Assignee: AUDI AG, Ingolstadt (DE)

( * ) Notice: Subject to any disclaimer, the term of this patent is extended or adjusted under 35 U.S.C. 154(b) by 190 days.

(21) Appl. No.: 16/343,109

(22) PCT Filed: Oct. 26, 2017

(86) PCT No.: PCT/EP2017/077442
§ 371 (c)(1),
(2) Date: Apr. 18, 2019

(87) PCT Pub. No.: WO2018/083005
PCT Pub. Date: May 11, 2018

(65) Prior Publication Data
US 2019/0258265 A1    Aug. 22, 2019

(30) Foreign Application Priority Data

Nov. 4, 2016    (DE) .................... 10 2016 221 680.5

(51) Int. Cl.
*G05D 1/02*    (2020.01)
*G01S 13/89*   (2006.01)
(Continued)

(52) U.S. Cl.
CPC .......... *G05D 1/0257* (2013.01); *G01S 13/89* (2013.01); *G01S 13/931* (2013.01);
(Continued)

(58) Field of Classification Search
None
See application file for complete search history.

(56) References Cited

U.S. PATENT DOCUMENTS 9,429,439 B2    8/2016 Stumper
9,587,948 B2    3/2017 Schuller et al.
(Continued)

FOREIGN PATENT DOCUMENTS

CN    101551455 A    10/2009
CN    ON 101946250 A    1/2011
(Continued)

OTHER PUBLICATIONS

International Preliminary Report on Patentability directed to related International Patent Application No. PCT/EP2017/077442, dated May 7, 2019, with attached English-language translation; 15 pages.
(Continued)

*Primary Examiner* — Kelly D Williams
(74) *Attorney, Agent, or Firm* — Sterne, Kessler, Goldstein & Fox P.L.L.C.

(57) ABSTRACT

The disclosure relates to a method for operating a partially autonomous or autonomous motor vehicle. A digital three-dimensional height model of an infrastructure interior which has at least one aisle that can be traversed by the motor vehicle can be provided by a data server device of the infrastructure for example. The height model describes a spatial situation within the infrastructure, and the topography of at least one section of a surface of a region of the infrastructure, said motor vehicle being located in the section, is detected by means of a sensor device of the motor vehicle. A controller of the motor vehicle generates a three-dimensional topographical map of the region by means of the height model using the ascertained topography. The controller ascertains the current position of the motor vehicle within the infrastructure using the result of the comparison, and the controller ascertains a route along the at least one aisle using the ascertained current position and the height model.

9 Claims, 1 Drawing Sheet

(51) Int. Cl.
*G01S 13/931* (2020.01)
*G08G 1/14* (2006.01)
*G08G 1/16* (2006.01)
*G08G 1/0967* (2006.01)
*G08G 1/0962* (2006.01)

(52) U.S. Cl.
CPC ......... *G05D 1/0255* (2013.01); *G05D 1/0276* (2013.01); *G08G 1/096725* (2013.01); *G08G 1/146* (2013.01); *G08G 1/165* (2013.01); *G01S 2013/9323* (2020.01); *G01S 2013/9324* (2020.01); *G08G 1/09623* (2013.01); *G08G 1/096775* (2013.01)

(56) References Cited

U.S. PATENT DOCUMENTS

| | | | |
|---|---|---|---|
| 10,584,971 B1* | 3/2020 | Askeland | G01C 21/30 |
| 2009/0202109 A1 | 8/2009 | Clar et al. | |
| 2013/0166202 A1* | 6/2013 | Bandyopadhyay | G01C 21/3626 701/501 |
| 2016/0260328 A1* | 9/2016 | Mishra | G08G 1/166 |
| 2017/0297625 A1 | 10/2017 | Irion et al. | |
| 2017/0351267 A1 | 12/2017 | Mielenz | |
| 2018/0053422 A1 | 2/2018 | Altinger et al. | |
| 2018/0240343 A1 | 8/2018 | Nordbruch | |
| 2020/0025873 A1 | 1/2020 | Kubertschak et al. | |

FOREIGN PATENT DOCUMENTS

| | | | | |
|---|---|---|---|---|
| CN | 101975578 A | 2/2011 | | |
| DE | 102012016800 A1 | 2/2014 | | |
| DE | 102013011824 A1 | 1/2015 | | |
| DE | 102014002150 B3 | 7/2015 | | |
| DE | 202015104709 U1 | 10/2015 | | |
| DE | 102014218429 A1 * | 3/2016 | ........... | B62D 15/027 |
| DE | 102014221777 A1 * | 4/2016 | ............ | G05D 1/028 |
| DE | 102015201204 A1 | 7/2016 | | |
| DE | 102015201209 A1 | 7/2016 | | |
| DE | 102015002405 A1 | 8/2016 | | |
| DE | 102015217388 A1 | 3/2017 | | |
| DE | 102015221237 A1 | 5/2017 | | |
| EP | 2806288 A1 | 11/2014 | | |
| JP | 2011033413 A | 2/2011 | | |

OTHER PUBLICATIONS

International Search Report and Written Opinion of the International Searching Authority directed to related International Patent Application No. PCT/EP2017/077442, dated Feb. 13. 2018, with attached English-language translation; 17 pages.

* cited by examiner

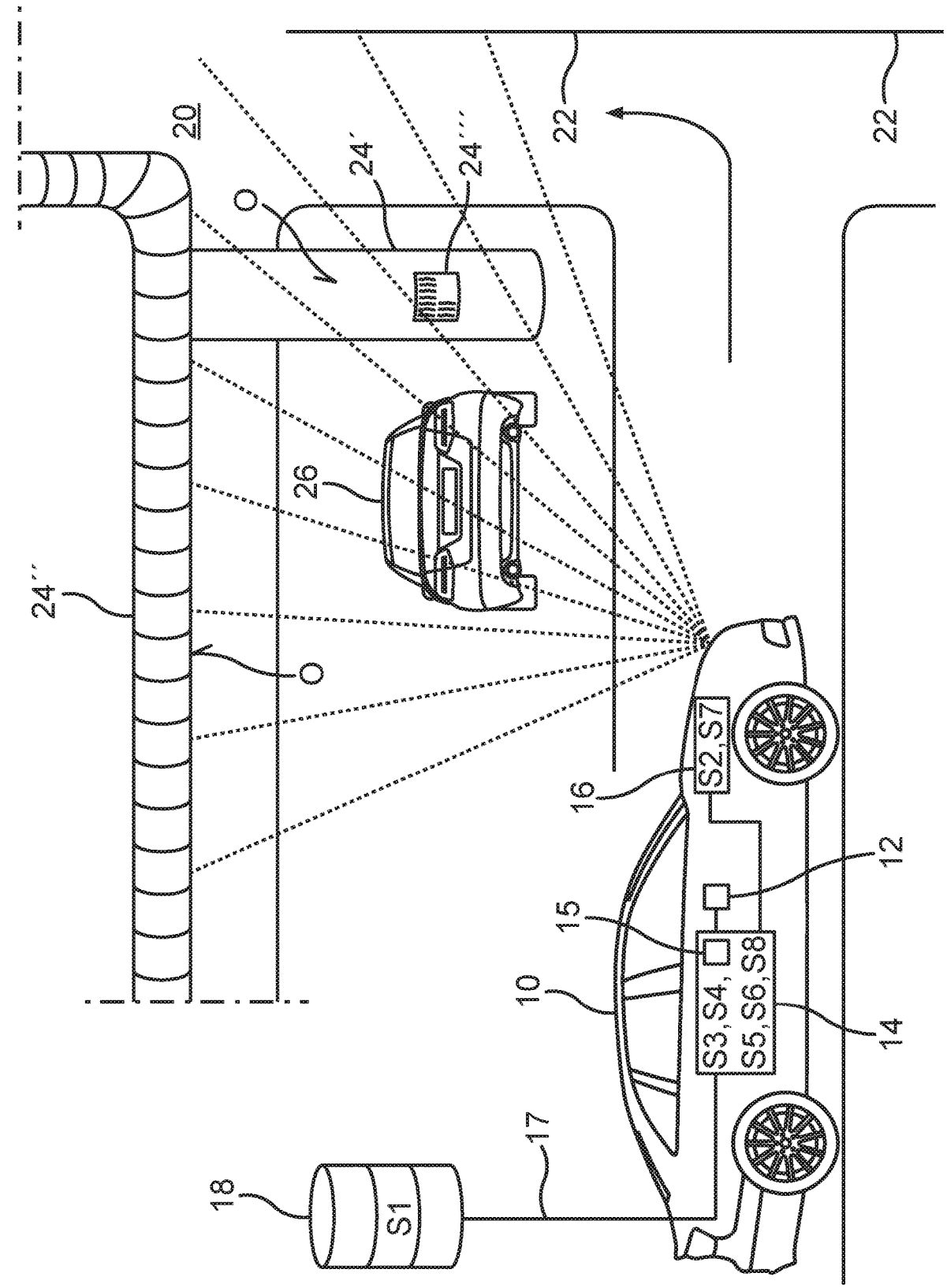

METHOD FOR OPERATING A PARTIALLY AUTONOMOUS OR AUTONOMOUS MOTOR VEHICLE, AND MOTOR VEHICLE

TECHNICAL FIELD

The present application relates to a method for operating a semi-autonomous and/or autonomous motor vehicle.

BACKGROUND

Semi-autonomous or fully autonomous motor vehicles can orient themselves using positional signals, e.g. a GPS signal. A particular difficulty arises within infrastructures that either are or form a construction, since positional signals of this kind are often unavailable here. Conventional motor vehicles are, for example, driven into a parking garage, parked therein and driven back out again by a driver. Autonomously driven vehicles, however, have to find their own way into and back out of the example parking garage, while also having to automatically orient themselves within the parking garage.

Without additional sensors in existing infrastructures, for example in parking garages, underground parking garages or other constructions, piloted motor vehicle have difficulties orienting themselves since no GPS link is possible in the infrastructure, for example, and there are often multiple stories that a positional signal of this kind cannot distinguish between.

DE 20 2015 104 709 U1 discloses a mobile communications device that is capable of establishing a link to a motor vehicle and to an infrastructure interface for a connection to a building. By means of the infrastructure interface, data describing a floor plan of the building can be retrieved.

DE 10 2012 016 800 A1 describes a method for determining a vehicle position within a mapped environment by means of fixed position-detection sensors arranged in the mapped environment. Said sensors then steer the motor vehicle through the mapped environment.

DE 10 2014 002 150 B3 describes a method for determining an absolute position of a mobile unit having an optical environment sensor, by which a marker of the navigation environment can be detected.

However, difficulties may arise if the infrastructure, i.e. the building, is for example a multi-story parking garage having aisles of identical design. A piloted motor vehicle having camera detection is dependent on signs being fully legible and not, for example, being dirty or covered by a poorly or incorrectly parked motor vehicle.

BRIEF DESCRIPTION OF THE DRAWINGS

FIG. 1 illustrates the principle of the method according to the application on the basis of an example embodiment.

DETAILED DESCRIPTION

The present application relates to a method for operating a semi-autonomous and/or autonomous motor vehicle. In this respect, a semi-autonomous driving mode should be understood as meaning partial automation of the motor vehicle, i.e. the motor vehicle being operated by a driver-assistance system by means of partially independent driving, for example automatic parking, or the use of a congestion assistant or lane-keeping function. An autonomous driving mode is a fully automated driving mode in which the driving can be referred to as piloted driving. In this case, the vehicle is driven constantly by the driver-assistance system.

Semi-autonomous or fully autonomous motor vehicles can orient themselves using positional signals, e.g. a GPS signal. A particular difficulty arises within infrastructures that either are or form a construction, since positional signals of this kind are often unavailable here. Conventional motor vehicles are, for example, driven into a parking garage, parked therein and driven back out again by a driver. Autonomously driven vehicles, however, have to find their own way into and back out of the example parking garage, while also having to automatically orient themselves within the parking garage.

Without additional sensors in existing infrastructures, for example in parking garages, underground parking garages or other constructions, piloted motor vehicle have difficulties orienting themselves since no GPS link is possible in the infrastructure, for example, and there are often multiple stories that a positional signal of this kind cannot distinguish between.

DE 20 2015 104 709 U1 discloses a mobile communications device that is capable of establishing a link to a motor vehicle and to an infrastructure interface for a connection to a building. By means of the infrastructure interface, data describing a floor plan of the building can be retrieved.

DE 10 2012 016 800 A1 describes a method for determining a vehicle position within a mapped environment by means of fixed position-detection sensors arranged in the mapped environment. Said sensors then steer the motor vehicle through the mapped environment.

DE 10 2014 002 150 B3 describes a method for determining an absolute position of a mobile unit having an optical environment sensor, by which a marker of the navigation environment can be detected.

However, difficulties may arise if the infrastructure, i.e. the building, is for example a multi-story parking garage having aisles of identical design. A piloted motor vehicle having camera detection is dependent on signs being fully legible and not, for example, being dirty or covered by a poorly or incorrectly parked motor vehicle.

A problem addressed by the application is that of improving navigation of a semi-autonomously or fully autonomously driven motor vehicle.

The problem is solved by the method according to an embodiment of the invention and the apparatuses according to an embodiment of the invention in accordance with the independent claims. The dependent claims set out additional advantageous developments.

The application is based on the idea of using a three-dimensional map of the interior of the infrastructure in combination with a non-optical sensor device for the navigation. In this way, the vehicle can orient itself even in poor lighting conditions or, for example, when there are no signs. Furthermore, additional fixed infrastructure elements can be used, for example ventilation pipes attached to a ceiling of the interior of the building.

The method according to an embodiment of the invention for operating a semi-autonomous and/or autonomous motor vehicle is first characterized by providing a digital, three-dimensional elevation model of an interior of an infrastructure, the interior having at least one aisle along which the motor vehicle can drive, and the elevation model describing a spatial situation within the infrastructure. In this case, the infrastructure is preferably a building.

The digital, three-dimensional elevation model can also be referred to as a digital, three-dimensional map of the interior, or understood as being a digital terrain model. The digital elevation model of the interior describes a natural surface of the interior of the infrastructure, without describing any movable objects located therein that do not belong to the infrastructure. In other words, the digital elevation model describes, for example, the inner surface of a parking garage, together with the fixed elements belonging to the parking garage such as pillars or ceiling pipes, but not the motor vehicles parked therein. Put another way, the digital elevation model describes the surface of the infrastructure and the associated infrastructure elements such as pillars, ceiling structures or ceiling pipes.

By means of a sensor device of the motor vehicle, a topography of at least one part of a surface of a particular region of the infrastructure in which the motor vehicle is located is detected. A "sensor device" in this case should be understood as being an instrument or instrument component that is designed to detect or sense the surface and/or surface structure and to do so comprises at least one sensor, for example a laser scanner or a radar.

On the basis of the determined topography, a control device of the motor vehicle creates a three-dimensional, topographical map of the region. "Control device" here refers to an instrument or instrument component that is designed to manage and generate control signals and to do so can comprise, for example, a control chip and/or a control board and/or a microprocessor and/or microcontroller.

By means of the control device, the created topographical map is compared with the elevation model. On the basis of a result of the comparison, a current position of the motor vehicle within the infrastructure is determined. Although the topographical map determined by the control device may also be depicted as a surface of a parked motor vehicle, the control device can, for example, recognize these as not belonging to the infrastructure, for example within a predefined deviation tolerance range, and can disregard them. For this purpose, a predefined threshold for the level of correlation between the topographical map and the elevation model can be taken into account in the comparison, such that the positioning can be carried out even when the correlation is 90%, for example. According to another alternative, the control device can, for example, determine at least one position marker on the basis of the determined topographical map, for example a structure of ceiling pipes or a combination of ceiling pipes and pillars, on the basis of which the comparison can then be carried out.

On the basis of both the determined current position of the motor vehicle in the interior and the elevation model, a route along the at least one aisle is determined. Optionally, the control device can generate an appropriate control signal for steering the motor vehicle and can transmit said signal to a navigation device, i.e. an instrument or instrument component for assisting the operation of the motor vehicle, and/or to a driver-assistance system.

As a result, it is possible to navigate within buildings, e.g. in parking garages or underground parking garages, in particular to navigate a piloted motor vehicle, without having to install additional sensors within the building. In addition, navigation is made possible in poor visibility conditions or when inscriptions on signs are illegible, for example.

Advantageously, as a result the motor vehicle can additionally use an existing infrastructure element for orientation purposes. This means, for example, that no additional guide tracks for piloted motor vehicles have to be positioned in a parking garage. In other words, no additional construction measures are required within the infrastructure. By using a three-dimensional elevation model, the motor vehicle can also orient itself to the extent that it is possible to determine a story or level on which the motor vehicle is currently located. By means of the method according to an embodiment of the invention, a three-dimensional geometry of, for example, a sign can also be detected, and advantages result if, for example, the pillar or sign is blocked.

According to a particularly preferred embodiment of the method according to an embodiment of the invention, the sensor device can detect at least one stationary object of the infrastructure, referred to as an infrastructure element, as a position marker, the topography of the region being able to be detected on the basis of the at least one detected position marker. As a result, orientation and thus navigation are considerably improved since a distinction can thus be drawn between various stories of a building. Preferably, the object of the infrastructure in this case is a pillar, pipe or ceiling structure of the infrastructure.

The topography of the region can preferably be detected by a non-optical sensor of the sensor device, preferably by a lidar sensor and/or radar sensor and/or a laser-based sensor and/or an ultrasound-based sensor. In the process, any non-optical sensor that can detect a surface structure and/or topography of an object, for example a surface-scanning sensor, can also be referred to as a sensor in this respect. This constitutes a particularly advantageous embodiment of the method according to an embodiment of the invention since the navigation of the motor vehicle is now independent of lighting conditions, the dirtiness of a position marker or, for example, objects obscuring signs.

If the elevation model is provided by receiving the elevation model from a data server device of the infrastructure, said device being external to the motor vehicle, load on a storage medium of either the motor vehicle or the control device can be reduced, for example, since the elevation model can be downloaded as the vehicle enters the building and then deleted again later, for example. In addition, availability of the elevation model is improved in this way since the motor vehicle user need not worry about obtaining all the elevation models required for a journey before setting off.

The determination of the route can depend on a predefined journey destination. For example, the control device can, for example, receive information from a parking guidance system of the infrastructure regarding where there is a free parking space. The motor vehicle can then drive directly to this free space.

According to a particularly preferred embodiment of the method according to an embodiment of the invention, the elevation model can be provided by the topography of the infrastructure being detected by a non-optical detection apparatus external to the motor vehicle. For example, the example parking garage can be surveyed when empty in that, the elevation model of the empty parking garage can be created using a radar or an ultrasonic sensor, for example. A particularly precise elevation model is provided as a result.

The problem stated above is also solved by a control device according to an embodiment of the invention, which can preferably comprise a microcontroller and/or a microprocessor, the control device being designed to carry out those method steps of a method of the above-described embodiments that concern a control device. The aforementioned advantages are produced.

The problem stated above is also solved by a motor vehicle according to an embodiment of the invention, characterized by an embodiment of a control device according to an embodiment of the invention. The aforementioned advantages are produced here, too. The motor vehicle can preferably be designed as an automobile, for example a passenger car.

The application will be explained again in more detail on the basis of the accompanying drawings using specific example embodiments. The example embodiments described below are preferred embodiments of the invention. In the example embodiments, however, the described components of the embodiments each represent separate features of the application that are to be considered independently of one another and which each develop the application independently of one another and thus can also be deemed a component of the application in isolation or in a combination other than that disclosed. Furthermore, the described embodiments can also be supplemented with features of the application other than those already described. Elements having the same function have the same reference numerals in the sole FIGURE ("FIG. 1"), which shows:

a schematic outline of an embodiment of the method according to the application, an embodiment of the control device according to the application and an embodiment of the motor vehicle according to the application.

The sole FIGURE illustrates the principle of the method according to the application on the basis of an example embodiment. In this regard, the sole FIGURE shows a motor vehicle 10, which can preferably be designed as an automobile, for example a passenger car. Optionally, the motor vehicle 10 can comprise a navigation device 12, which can be designed as a navigation instrument, for example. The motor vehicle 10 comprises a control device 14 and a sensor device 16. The control device 14 can, for example, be designed as a control board or a control chip and can preferably comprise a microcontroller and/or a microprocessor 15. By way of example, the control device 14 can be designed as a controller of the motor vehicle 10 and can, for example, comprise a communications unit, i.e. an instrument component for transmitting and receiving signals, by means of which a data communications link 17 to, for example, a data server device 18 external to the motor vehicle can be established. The data server device 18 can, for example, comprise a data server of the infrastructure.

The sensor device 16 of the motor vehicle 10 can preferably comprise a non-optical sensor, e.g. a radar sensor and/or a lidar sensor and/or an ultrasound-based sensor. In the process, the sensor device can be arranged, for example, on a bumper of the motor vehicle or in a skin of the motor vehicle 10. Alternatively, the sensor device 16 can comprise an infrared-based camera, for example.

By way of example, the motor vehicle 10 in the sole FIGURE is located in a parking garage. In this regard, the FIGURE shows an interior 20 of the example parking garage, and the motor vehicle 10 is driving in a straight line along an aisle 22. By way of example, the motor vehicle 10 is located in front of a junction between two aisles 22. The FIGURE also shows infrastructure elements, which can also be referred to as structural elements or interior fitting elements. These include all fixed elements on the infrastructure, for example a ventilation pipe 24" and a pillar 24'.

In addition, a sign 24''' is also shown by way of example; this can also be referred to as an interior fitting element, but may, for example, be so dirty that the writing on the example sign 24''' can no longer be visually perceived. By way of example, next to the pillar 24' there is an additional, parked motor vehicle 26.

In a first method step S1, a digital, three-dimensional elevation model of the interior of the infrastructure is provided. In other words, a digital, three-dimensional map of the interior is provided, which can preferably describe the interior 20 of the infrastructure together with its infrastructure elements. Optionally, this elevation model can be created by scanning the empty building from inside, for example, as a result of which the topography of the infrastructure (in other words the interior 20 of the infrastructure) is described. The topography can be detected in this manner preferably by a non-optical detection apparatus external to the motor vehicle, for example by a scanner. Appropriate instruments are known to a person skilled in the art from the prior art. The topography is preferably detected in this manner when the motor vehicles 10, 26 are not located in the building, but rather solely the infrastructure elements 24', 24" fixed in or on the building.

The three-dimensional elevation model can then be provided to the motor vehicle 10 as map material. Preferably, the digital elevation model can be stored in a memory device (not shown in the FIGURE) of the data server device 18 external to the motor vehicle. In this case, for example, at an entrance to the building the motor vehicle 10 can establish a data communications link 17 to the data server device 18 external to the motor vehicle, for example by means of a communications unit (not shown in the FIGURE) of the control device 14, which can comprise a transmitter and a receiver, for example. The data communications link 17 can, for example, be a wireless communications link, for example a WLAN link, a Bluetooth link or another vehicle-to-infrastructure communications link. By way of example, a position at an entrance to the building can be intended as the interface for transmitting the digital elevation model. By means of a positional signal, for example a GPS signal, the example entrance can be determined, and the establishment of the data communications link 17 and transmission of the digital elevation model can be initiated.

The elevation model, which can describe the interior 20 or its topography for example in a coordinates system, can optionally also be downloaded, for example, as map material at any other location of the motor vehicle, for example when the motor vehicle 10 is in the garage of the user; when the motor vehicle 10 enters the building, the elevation model stored in the control device 14 or in the navigation device 12 can then be used offline.

The elevation model describes a spatial situation within the infrastructure. If the motor vehicle 10 is located in the building, the sensor device 16, which can for example comprise a lidar sensor, a radar sensor and/or an ultrasound-based sensor, detects the topography of at least one part of a surface O of the particular region of the infrastructure in which the motor vehicle 10 is currently located (S2). By way of example, as indicated in the FIGURE (in dashed lines), the ceiling pipe 24" and the surface O of the pillar 24' and the sign 24''' are specifically detected as position markers (S2), for example are scanned.

In the example in the FIGURE, for this purpose the motor vehicle 10 can, for example, use a distance sensor, which can be arranged on a bumper of the motor vehicle 10, for example. The coordinate data detected in this manner describing the topography of the surface O can be compiled by the control device 14 into a three-dimensional, topographical map of the region of the interior 20, for example. By creating the three-dimensional, topographical map in this manner (S3), a means which can be compared with the elevation model (S4) and also describes the position marker is provided. Information can thus be provided on the current position of the motor vehicle 10. By using a non-optical sensor device 16, the scanned sign 24''' can also provide information on the current position, although it may be dirty in the example in the FIGURE. In this case, it is not the inscription on the sign 24''' that is decisive, but rather a three-dimensional structure of the sign 24'''. The comparison S4 can be carried out by means of appropriate algorithms.

In the example in the FIGURE, the control device 14 can determine (S5), for example, that it may be located in a particular underground level of the building, for example. In this way, it can also be determined (S5) that the motor vehicle 10 may be located in front of the example T-junction between the aisles 22.

Optionally, from the data server device 18, external to the motor vehicle, of the building, which may, for example, include a parking guidance system, the control device 14 may receive a parking signal which may, for example, describe a free parking space in one of the upper levels as a journey destination. By way of example, this example parking signal can describe the free parking space coordinates which may also be described by the three-dimensional elevation model. On the basis of the determined current position of the motor vehicle 10 and on the basis of the coordinates of the free parking space in the three-dimensional elevation model, a route can be determined (S6) that leads along the aisle 22 and which, in the example in the FIGURE, may describe that the motor vehicle 10 should turn left at the example T-junction to arrive at the free parking space. For this purpose, the determined route can, for example, be transmitted to the navigation device 12, which can then steer the motor vehicle on the basis of said travel route. The motor vehicle 10 can be steered and/or navigated in accordance with a technology known from the prior art.

Alternatively or additionally, by means of the method according to an embodiment of the invention, a parking garage exit can also be found, for example, and the motor vehicle 10 can be steered to the parking garage exit.

The example embodiment described above illustrates the principle of the application of detecting the interior 20 of the infrastructure and using these data as an elevation model for piloted driving, for example, and optionally for extended navigation.

According to a further example embodiment, a parking garage can be scanned, for example. By way of example, the example parking garage can be scanned once and the data can be provided. In this way, a piloted motor vehicle 10 can, for example, orient itself in the parking garage or underground parking garage by, for example, matching data collected by the motor vehicle 10 by way of sensors, and can find paths to different levels or the exit, for example. An optional interface in the example parking garage or example underground parking garage can be an entrance to and/or exit from the navigation map.

Advantageously, navigation and piloted driving in, for example, parking garages or underground parking garages is possible without installing additional sensors in parking garages.

For the technical implementation, the parking garage or underground parking garage can, for example, be scanned by suitable sensors, for example by means of a radar. A dataset related to the parking garage can be created, i.e. the digital, three-dimensional elevation model can be created, the motor vehicle 10 being able to process the example dataset. The data can be provided (S1) online or offline. To allow the motor vehicle 10 to find its location in the example parking garage, the sensors of the motor vehicle 10 can be linked to said data. In other words, the topographical map created can be compared with the elevation model (S4). Optionally, ways into and out of the example parking garage or example underground parking garage can be computed, i.e. a route along the at least one aisle 21 can be determined (S6). Piloted use and/or navigation in parking garages or underground parking garages is possible.

The invention claimed is:

1. A method for operating a semi-autonomous and/or autonomous motor vehicle, the method comprising:
   receiving, by a control device, a digital, three-dimensional elevation model of an interior of an infrastructure, the interior having at least one aisle along which the motor vehicle can drive, and the elevation model describing a spatial situation within the infrastructure;
   detecting, by a sensor device of the motor vehicle, a topography of at least one part of a surface of a particular region of the infrastructure in which the motor vehicle is located;
   creating, by the control device, a three-dimensional topographical map of the region based on the topography;
   comparing, by the control device, the three-dimensional topographical map with the elevation model by determining a level of correlation between the three-dimensional topographical map and the elevation model;
   determining, by the control device, a current position of the motor vehicle within the infrastructure based on that the level of correlation is higher than a predefined threshold;
   determining, by the control device, a route along the at least one aisle based on both the current position and the elevation model;
   transmitting, by the control device, the route to a navigation device of the motor vehicle; and
   steering, by the navigation device, the motor vehicle based on the route.

2. The method according to claim 1, further comprising:
   detecting, by the sensor device, a stationary object of the infrastructure as a position marker, wherein the topography is detected based on the position marker.

3. The method according to claim 2, wherein a pillar, a pipe or a ceiling structure of the infrastructure is detected as the stationary object of the infrastructure.

4. The method according to claim 1, wherein the detecting of the topography includes detecting by a non-optical sensor of the sensor device, the non-optical sensor including at least one of a lidar-based sensor, a radar-based sensor, a laser-based sensor, and an ultrasound-based sensor.

5. The method according to claim 1, wherein the elevation model is received from a data server device of the infrastructure, the device being external to the motor vehicle.

6. The method according to claim 1, wherein the determining the route is further based on a predefined journey destination.

7. The method according to claim 1, wherein the elevation model is created using the topography being detected by a non-optical detection apparatus external to the motor vehicle.

8. A control device comprising a digital device and a communications unit, the digital device comprising at least one of a microcontroller and a microprocessor, and wherein the control device is configured to:
   receive, by the communications unit, a digital, three-dimensional elevation model of an interior of an infrastructure, the interior having at least one aisle along which the motor vehicle can drive, and the elevation model describing a spatial situation within the infrastructure;
   receive, by the digital device, from a sensor device of the motor vehicle, a topography of at least one part of a surface of a particular region of the infrastructure in which the motor vehicle is located;

create, by the digital device, a three-dimensional topographical map of the region based on the topography;

compare, by the digital device, the three-dimensional topographical map with the elevation model by determining a level of correlation between the three-dimensional topographical map and the elevation model;

determine, by the digital device, a current position of the motor vehicle within the infrastructure based on that the level of correlation is higher than a predefined threshold;

determine, by the digital device, a route along the at least one aisle based on both the current position and the elevation model;

transmit, by the digital device, the route to a navigation device of the motor vehicle; and steer, by the navigation device, the motor vehicle based on the route.

9. A motor vehicle comprising a control device configured to:

receive a digital, three-dimensional elevation model of an interior of an infrastructure, the interior having at least one aisle along which the motor vehicle can drive, and the elevation model describing a spatial situation within the infrastructure;

receive from a sensor device of the motor vehicle, a topography of at least one part of a surface of a particular region of the infrastructure in which the motor vehicle is located;

create a three-dimensional topographical map of the region based on the topography;

compare the three-dimensional topographical map with the elevation model by determining a level of correlation between the three-dimensional topographical map and the elevation model;

determine a current position of the motor vehicle within the infrastructure based on that the level of correlation is higher than a predefined threshold;

determine a route along the at least one aisle based on both the current position and the elevation model; and transmit the route to a navigation device of the motor vehicle for steering the motor vehicle based on the route.

\* \* \* \* \*